United States Patent [19]

Hendrix

[11] 4,082,917

[45] Apr. 4, 1978

[54] SPACER FOR AERIAL CABLES

[75] Inventor: William Louis Hendrix, Amherst, N.H.

[73] Assignee: Hendrix Wire & Cable Corporation, Milford, N.H.

[21] Appl. No.: 819,367

[22] Filed: Jul. 27, 1977

[51] Int. Cl.² ............... H02G 7/12; H01B 17/16; F16G 11/00

[52] U.S. Cl. ............... 174/146; 24/132 R; 81/3 R; 81/53.1; 174/168; 248/61; 248/74 R

[58] Field of Search ............ 174/41, 146, 160, 168; 24/73 SA, 73 AP, 132 R, 132 CS; 248/61, 74 R, 74 A

[56] References Cited

U.S. PATENT DOCUMENTS 4,020,277   4/1977   LaChance, Sr. et al. ............ 174/146

Primary Examiner—Laramie E. Askin
Attorney, Agent, or Firm—Robert L. Thompson

[57] ABSTRACT

This disclosure is directed to a spacer for aerial cables for supporting one of more electrical conductor cables above the ground. It includes a body member having at least one concave seat adapted to receive a conductor cable, at least one generally arcuate retaining means adapted to engage a surface of the conductor cable and toggle means adapted to cooperate with the retaining means to firmly hold the conductor cable in its seat. One end of the cable retaining means is pivotally supported on the body member. The toggle means is pivotally supported on the other end of the cable retaining means. The toggle is provided with second ratchet tooth means and also generally arcuate third ratchet tooth means. Ratchet tooth means are also provided on the body member outwardly of the concave seat. The teeth of the toggle ratchet tooth means are engageable with the teeth of the body ratchet tooth means when the toggle means is rotated about its pivotal connection to the retaining means thereby to cause the retaining means to firmly hold the conductor cable in the concave seat.

12 Claims, 10 Drawing Figures

U.S. Patent  April 4, 1978  Sheet 1 of 2  4,082,917
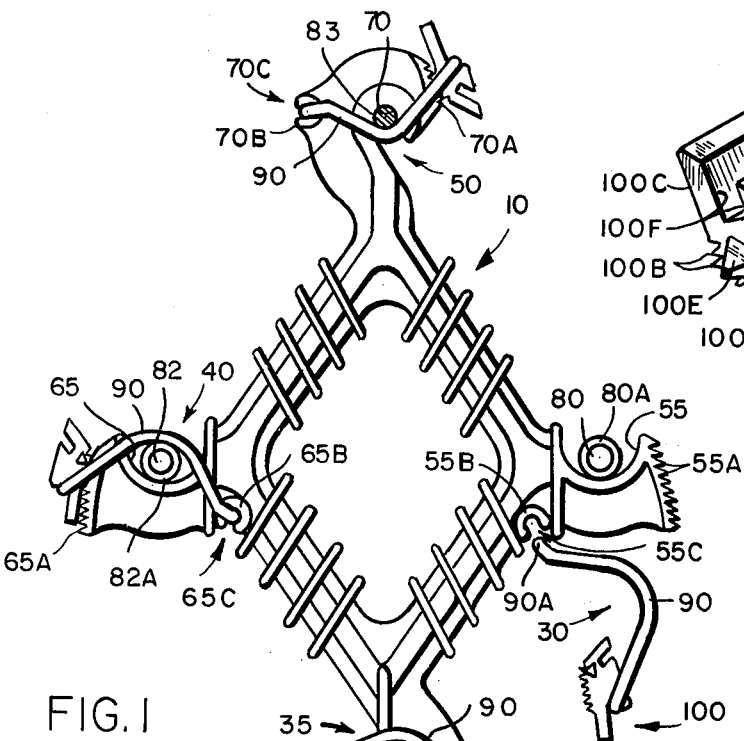
FIG. 1
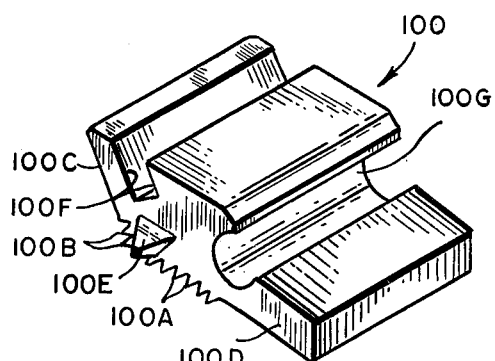
FIG. 2
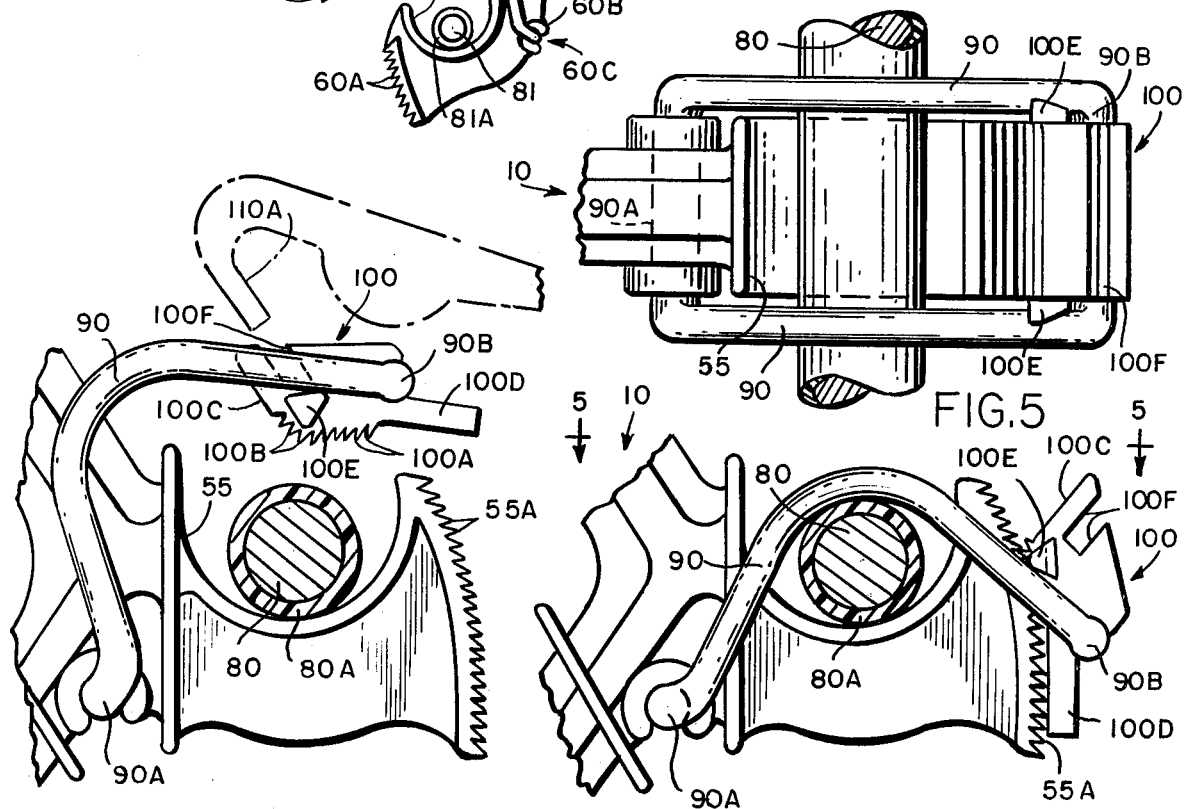
FIG. 3
FIG. 4
FIG. 5

SPACER FOR AERIAL CABLES

BACKGROUND OF THE INVENTION

This invention relates to spacers for aerial cables for supporting one or more electrical conductor cables above the ground.

Overhead conductor cables are commonly suspended from a messenger cable usually made of steel. The messenger cable is supported on poles or towers with the conductor cable spacers arranged at spaced intervals along the messenger cable to suspend one or more conductor cables. Since many power circuits require three phase electrical power, it is often convenient to suspend conductor cables in groups of three employing a spacer which supports all three conductor cables and simultaneously maintains the conductors in spaced relation.

If the advantages of suspending conductors in this manner are to be fully availed, it is essential that the spacer be easily attached to the messenger cable and to the conductor cables.

To provide ease of attaching the spacer to the messenger and conductor cables and to reduce the number of parts required, the means for retaining the cables in their respective seats of the body member of the spacer should accommodate messenger and conductor cables of varying cross sectional diameters without providing bushings, sleeves, grommets or the like of different sizes to surround the cables at their seats.

The construction of the spacer should be such that all of its parts have both high mechanical strength and high electrical strength and are durable in use.

In addition, all parts of the spacer should be economical to manufacture and to assemble to the final form of the spacer.

The construction and method of operation of the spacer should cause the conductor cables to be held firmly in their seats with substantially the same pressure on each cable so that after installation none of them will move longitudinally in their seats.

In addition, the construction of the spacer should be such that the means for retaining the conductor cables in their seats cannot be accidentally disengaged.

On Apr. 26, 1977 U.S. Pat. No. 4,020,277 was granted to Hendrix Wire & Cable Corporation, the owner of this application. In use of the spacer for aerial cables disclosed in that patent, it was found that the three cables were not held in their seats by substantially the same pressures so that occasionally one or more of the cables moved longitudinally in their seats.

It was also found that occasionally a branch of a tree or other object accidentally hit one of the outwardly projecting members 90B of the spacer, disengaging the ratchet teeth 101 from the ratchet teeth 55A, 60A or 65A, thus releasing the cable retaining means 90.

To the best of my knowledge, the spacer of U.S. Pat. No. 4,020,277 is the closest prior art to the spacer of the present invention.

The spacer for aerial cables of the present invention is a great improvement upon the spacer disclosed in said patent and it solves the above described objectives.

BRIEF SUMMARY OF THE INVENTION

One object of this invention is to provide a new spacer for aerial cables.

Another object is to provide such a spacer which is economical to manufacture and to assemble and which is durable in use.

A further object is to provide such a spacer which is free from bushings, sleeves and grommets surrounding the messenger and conductor cables and which can accommodate cables of a wide range of cable sizes.

Yet another object is to provide such a spacer all parts of which are made of the same thermoplastic material and can be molded at the same time with a mold cut to make all parts.

A still further object is to provide such a spacer which is both weather and track resistant.

Another object is to provide such a spacer which includes novel cable retaining means which resist forces tending to pull cables out of their seats and which have extra holding power when such forces are exerted.

Still another object is to provide such a spacer which includes novel toggle means for use in securely holding the cables in their seats with substantially the same pressures.

Yet another object is to provide such a spacer in which the means for retaining the cables in their seats cannot be accidentally disengaged.

Further objects and advantages of this invention will be apparent to persons skilled in the art from the following description taken in conjunction with the accompanying drawings.

In general, a spacer embodying this invention includes a body and at least one generally concave seat on the body which is adapted to receive a conductor cable. It also includes first generally arcuate ratchet tooth means on the body located outwardly from said concave seat, first generally arcuate retaining means adapted to engage a surface of a conductor cable positioned in the seat, and first pivot means adjacent to one end of the retaining means for maintaining a pivotal connection between one end of the retaining means and the body. This pivot means is located adjacent to the side of the seat which is opposite to the first ratchet tooth means. The spacer also includes toggle means which has second ratchet tooth means on one of its surfaces and third ratchet tooth means which is generally arcuate and extends from one end of the second ratchet tooth means on the same surface. Second pivot means is provided adjacent to the other end of the retaining means for maintaining a pivotal connection between the retaining means and the toggle means.

Upon rotation of the toggle means about the second pivot means in one direction, the teeth of the arcuate third ratchet tooth means first engage some of the teeth of the first ratchet tooth means and then the teeth of the second ratchet tooth means engage other teeth of the first ratchet tooth means so that the second ratchet tooth means firmly holds a conductor cable in the concave seat.

In a preferred embodiment, the toggle means also includes a first member having a substantially flat surface which extends outwardly from the end of the third ratchet tooth means which is remote from the second ratchet tooth means.

In yet another embodiment, the toggle means also includes a second member having a substantially flat surface which extends outwardly from the end of the second ratchet tooth means which is remote from the third ratchet tooth means.

According to another embodiment, the retaining means includes a pair of spaced generally arcuate arms connected together at one end by a generally cylindrical member and the toggle means includes socket means extending transversely of the side thereof which is opposite to the second ratchet tooth means for rotatively receiving the generally cylindrical member. Preferably, the socket means includes a slot through which the generally cylindrical member may be snapped to retain it in said socket means.

In yet another embodiment, the toggle means also includes slot means extending into its side which is opposite to the side which includes the second and third ratchet tooth means and this slot is adapted to receive an end of an actuating tool.

In still another embodiment, the toggle means also includes projecting members which extend outwardly from its edges adjacent to the third ratchet tooth means.

According to another preferred embodiment, the retaining means, body and toggle means are all made of the same thermoplastic material which may be high density polyethylene.

It will be apparent to persons skilled in the art that this invention has satisfied the above described objects.

BRIEF DESCRIPTION OF THE DRAWINGS

FIG. 1 is an elevational view of a spacer for aerial cables embodying this invention with two of the generally arcuate retaining means engaging a messenger cable and a conductor cable respectively, one retaining means in open position and another retaining means with its generally cylindrical end member in a position to be snapped into a socket means of the body of the spacer;

FIG. 2 is an isometric view of a toggle means;

FIG. 3 is an enlarged elevational view showing an electrical conductor cable placed in a generally concave conductor seat with the major portion of the body of the spacer broken away, with the retaining means and toggle means in a partially open position, and with an actuating tool shown in dot-dash lines;

FIG. 4 is a view like FIG. 3 but showing the generally arcuate retaining means engaging a conductor cable and the toggle means in closed position;

FIG. 5 is a plan view looking in the direction of the lines 5—5 of FIG. 4;

DETAILED DESCRIPTION OF THE EMBODIMENT SHOWN IN THE DRAWINGS

Figure 6:
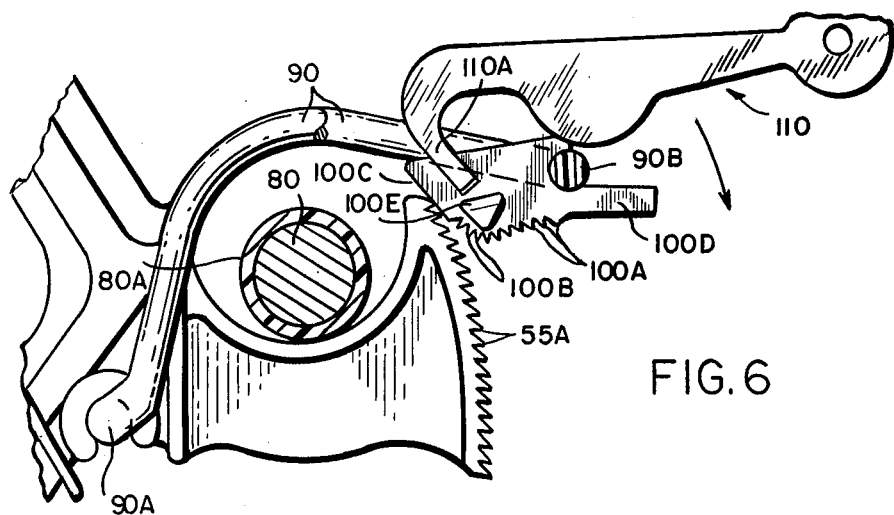
FIG. 6 is a view like FIG. 3 but with one side of the retaining means broken away and showing the tip of an actuating tool in a slot of the toggle means and a flat surface portion of the toggle means engaging the tips of the teeth of the first ratchet tooth means.

The spacer shown in the drawings includes a body 10 and four generally arcuate retaining means 30, 35, 40 and 50. The retaining means 30, 35 and 40 are identical. The retaining means 50 is the same as the other retaining means except that it is shorter.

The body is provided with three generally concave conductor cable seats 55, 60 and 65 and a generally concave messenger seat 70.

The body is provided with four generally arcuate ratchet tooth means 55A, 60A, 65A and 70A located outwardly from the concave seats 55, 60, 65 and 70.

Conductor cables 80, 81 and 82 are positioned in the seats 55, 60 and 65 respectively and they are provided with insulating sheaths 80A, 81A and 82A.

The messenger cable 83 is positioned in the concave messenger seat 70.

Each retaining means comprises a pair of spaced generally arcuate arms 90 connected together at one end by a first generally cylindrical member 90A and at the other end by a second generally cylindrical member 90B.

The body also comprises semi-cylindrical sockets 55B, 60B, 65B and 70B which are located adjacent to the sides of the seats 55, 60, 65 and 70 respectively and these sockets are located adjacent to the sides of the seats which are opposite to the sides of the seats on which the body ratchet tooth means are located. These sockets are provided with slots 55C, 60C, 65C and 70C.

The generally cylindrical members 90A of the retaining means may be snapped through the slots 55C, 60C, 65C and 70C thereby to rotatively position them in the sockets 55B, 60B, 65B and 75B respectively.

The toggle means 100 comprises second ratchet tooth means 100A and generally arcuate third ratchet tooth means 100B which extends from one end of the second ratchet tooth means.

The member 100C has a substantially flat surface which extends outwardly from the end of the third ratchet tooth means and the member 100D has a substantially flat surface which extends outwardly from the end of the second ratchet tooth means.

A pair of wedge shaped members 100E project outwardly from the longitudinal edges of the toggle means.

A slot 100F is adapted to receive the end 110A of the actuating tool 110.

The socket 100G is adapted to rotatively receive the second generally cylindrical member 90B of the retaining means with a snap fit and they form a pivotal connection between the toggle means and the retaining means.

To assemble the parts of the spacer, the cylindrical members 90B are snapped into the sockets 100G and the generally cylindrical members 90A are snapped into the slots 55C, 60C, 65C and 70C.

The body, retaining means and toggle means are made from the same thermoplastic material, the preferred embodiment being high-density polyethylene which has a low dielectric constant and has both weather and track resistant qualities. They may be molded at the same time with a mold cut to make all of them.

The actuating tool 110 is provided with a semi-cylindrical member 110B and a cylindrical end member 110C. This end member is provided with a spline 110D for receiving the spline of a hot line tool (not shown).

To install the spacer upon the messenger and conductor cables, the retaining means are rotated to open positions. The messenger seat 70 is then placed over the messenger cable 83 and the retaining means adjacent to it is partially closed to hold the messenger cable in its seat.

Then the conductor cables 80, 81 and 82 are positioned in the seats 55, 60 and 65.

Figure 7:
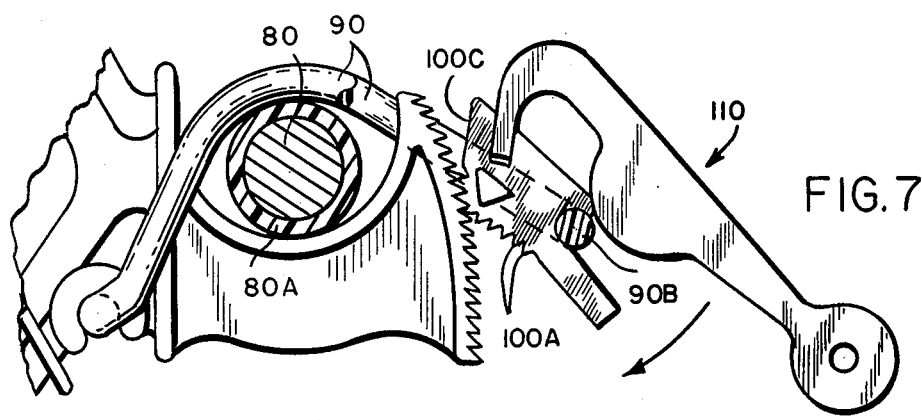
FIG. 7 is a view like FIG. 6 but showing the toggle means moved downwardly relative to the first ratchet tooth means and the generally arcuate third ratchet tooth means of the toggle means engaging the teeth of the first ratchet tooth means.
Figure 8:
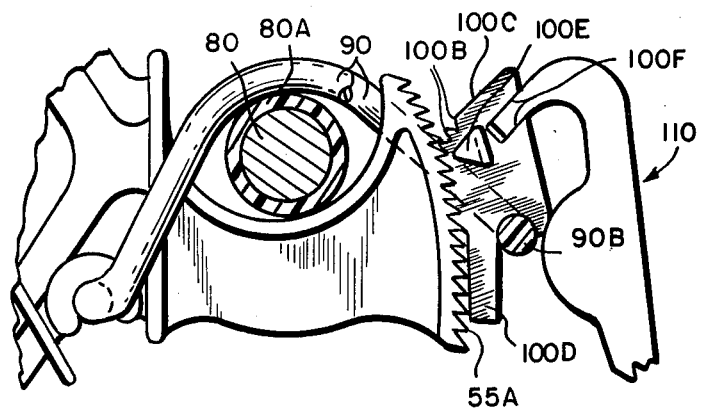
FIG. 8 is a view like FIG. 7 but showing the toggle means rotated about the third ratchet tooth means and the teeth of the second ratchet tooth means engaging the teeth of the first ratchet tooth means so that the generally arcuate retaining means firmly holds the conductor cable in the concave conductor seat.

Then one of the retaining means and one of the toggle means are moved successively from their positions of FIG. 3 to their positions of FIGS. 6, 7 and 8. During the first part of this movement, the surface of the member 100C slides along the ends of the first teeth of the first ratchet tooth means 55A as shown in FIG. 6. When the retaining means 90 engages the conductor cable 80 as shown in FIG. 7, the actuating tool 110 is moved clockwise (looking at FIG. 7) and this rotates the toggle means clockwise to its position of FIG. 8. During this movement, the arcuate ratchet teeth 100B first mesh with the first ratchet teeth 55A and as the toggle means is rotated from the position of FIG. 7 to the position of FIG. 8, the arcuate teeth 100B exert an increasing pulling force on the retaining means 90 thus increasing its pressure against the surface of the conductor cable 80 until the toggle means is completely closed as shown in FIG. 8. In this completely closed position, the second ratchet teeth 100A of the toggle means engage the first ratchet teeth 55A as shown in FIG. 8 thus holding the conductor 80 very firmly in its seat.

In the position of FIGS. 4, 5 and 8, the tips of the wedge shaped projecting members 100E engage the upper surfaces of the arms 90 of the retaining means thereby releasably holding the toggle means in its closed position.

The same procedure is then repeated to cause the conductors 81 and 82 to be held very firmly in their seats and also to cause the messenger cable 83 to be held in its seat.

By use of the toggle means of this invention, the conductors are held in their seats with substantially the same uniform pressure and more securely than in U.S. Pat. No. 4,020,277.

Figure 9:
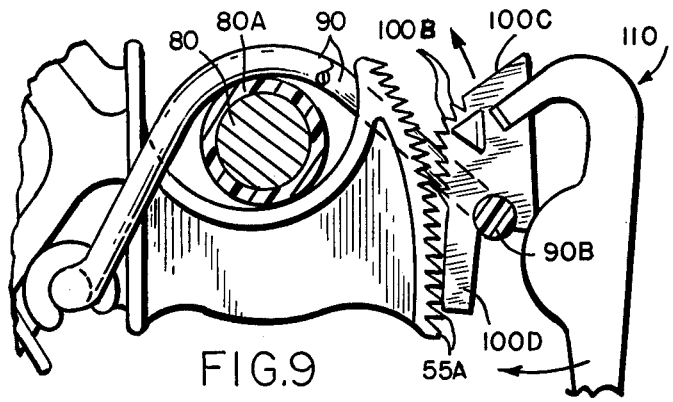
FIG. 9 is a view like FIG. 8 but showing one method of moving the retaining means and the toggle means out of engagement with the teeth of the first ratchet tooth means.
Figure 10:
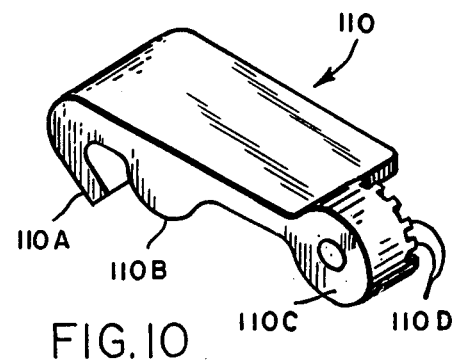
FIG. 10 is an isometric view of a tool for actuating the toggle means to engage and disengage its teeth of the first ratchet tooth means.

To release the gripping action of the retaining means 90 upon the cable, the actuating tool 110 is used to rotate the toggle means clockwise looking at FIG. 9. This causes the lower portion of the member 100D to press against the ends of the lower ratchet teeth 55A so that the ratchet teeth 100A and 100B of the toggle means are disengaged from the teeth 55A as shown in FIG. 9. Then the toggle means is moved upwardly until it passes above the first ratchet teeth 55A so that the conductor can be removed from its seat.

Another way of releasing the gripping action of the retaining means 90 upon the conductor cable 80 is to rotate the toggle means in a counterclockwise direction about the pivot 90B from the position of FIG. 8 to the position of FIG. 7, then to the position of FIG. 6, then to the position of FIG. 3 and finally to the fully open position so that the cable may be removed from its seat.

It is to be observed that there is no member which projects outwardly from the toggle means which can be accidentally engaged to disengage the teeth of the toggle means from the teeth of the body member such as by a branch of a tree or other object. Instead, it is necessary to use the tool 110 to actuate the toggle means to open the conductor seats. In this respect a spacer for an aerial cable embodying this invention is an improvement upon U.S. Pat. No. 4,020,277 in which it was found that the outwardly projecting end member 90B could be hit by a branch of a tree or other object to accidentally disengage the ratchet teeth 101 from the ratchet teeth 55A.

It will be apparent to persons skilled in the art that a spacer for aerial cables as claimed herein attains the objects of the invention as stated above.

It will also be apparent to persons skilled in the art that a spacer embodying this invention is new, economical to manufacture and assemble and efficient in use. The spacer can accommodate a wide range of cable sizes. Furthermore, it consists of only four parts, the body 10, three identical retaining means 30, 35 and 40, one slightly smaller retaining means 50 and four identical toggle means 100 and all four of these parts may be made of the same thermoplastic material at the same time using a single mold cut to make all of them. The body, retaining means and toggle means are weather and track resistant.

While one desirable embodiment of spacer for aerial cables embodying the invention has been shown in the drawings, it is to be understood that this disclosure is for the purpose of illustration only and that various changes in shape, proportion and arrangement of parts as well as the substitution of equivalent elements for those shown and desribed herein may be made without departing from the spirit and scope of the invention as set forth in the appended claims.

I claim:

1. In a spacer for aerial cables comprising, a body, at least one generally concave seat on said body, said seat being adapted to receive a conductor cable, first generally arcuate ratchet tooth means on said body located outwardly from said concave seat, first generally arcuate retaining means adapted to engage a surface of a conductor cable positioned in said seat, and first pivot means adjacent to one end of said retaining means for maintaining a pivotal connection between said one end of the retaining means and said body, said pivot means being located adjacent to the side of said seat which is opposite to said first ratchet tooth means, the improvement comprising, toggle means comprising second ratchet tooth means on one surface thereof and third ratchet tooth means which is generally arcuate and extends from one end of said second ratchet tooth means, and second pivot means adjacent to the other end of said retaining means for maintaining a pivotal connection between said other end of the retaining means and said toggle means, whereby upon rotation of said toggle means about said second pivot means in one direction, the teeth of said third ratchet tooth means first engage some of the teeth of said first ratchet tooth means and then the teeth of the second ratchet tooth means engage other teeth of said first ratchet tooth means and thereby said second ratchet tooth means is adapted to hold a conductor cable in said concave seat.

2. A spacer according to claim 1 wherein said toggle means also comprises a first member having a substantially flat surface which extends outwardly from the end of said third ratchet tooth means which is remote from said second ratchet tooth means.

3. A spacer according to claim 1 wherein said toggle means also comprises a member having a substantially flat surface which extends outwardly from the end of said second ratchet tooth means which is remote from said third ratchet tooth means.

4. A spacer according to claim 1 wherein said toggle means also comprises a first member having a substantially flat surface which extends outwardly from one end of said third ratchet tooth means and a second member which extends outwardly from one end of said second ratchet tooth means.

5. A spacer according to claim 1 wherein the retaining means comprises a pair of spaced generally arcuate arms connected together at said other end by a generally cylindrical member and said toggle means comprises socket means extending transversely of the side thereof which is opposite to said second ratchet tooth means for rotatively receiving said generally cylindrical member.

6. A spacer according to claim 5 wherein said socket means comprises a slot through which said generally cylindrical member may be snapped to retain it in said socket means.

7. A spacer according to claim 1 wherein said toggle means also comprises slot means extending into its side which is opposite to the side which includes said second and third ratchet tooth means, said slot being adapted to receive an end of an actuating tool.

8. A spacer according to claim 1 wherein said toggle means also comprises projecting members extending outwardly from its edges adjacent to said third ratchet tooth means.

9. A spacer according to claim 1 wherein said retaining means, body and toggle means are made of the same thermoplastic material.

10. A spacer according to claim 1 wherein said retaining means, body and toggle means are made of high density polyethylene.

11. In a spacer according to claim 1 which also comprises
 a generally concave messenger seat on said body spaced from said conductor seat and adapted to receive a messenger cable,
 fourth generally arcuate ratchet tooth means on said body located outwardly from said messenger seat,
 second generally arcuate retaining means adapted to engage a surface of a messenger cable positioned in said messenger seat, and
 third pivot means adjacent to one end of said second retaining means for maintaining a pivotal connection between said one end of said second retaining means and said body, said third pivot means being located adjacent to the side of said messenger seat which is located opposite to said fourth ratchet tooth means,
 the improvement comprising,
  second toggle means comprising fifth ratchet tooth means on one surface thereof and sixth ratchet tooth means which is generally arcuate and extends from one end of said fifth ratchet tooth means, and
  fourth pivot means adjacent to the other end of said second retaining means for maintaining a pivotal connection between said other end of the second retaining means and said second toggle means,
  whereby rotation of said second toggle means about said fourth pivot means in one direction, the teeth of said fifth ratchet tooth means first engage some of the teeth of said fourth ratchet tooth means and then the teeth of the second ratchet tooth means engage other teeth of said fourth ratchet tooth means and thereby said fifth ratchet tooth means is adapted to hold a messenger cable in said concave messenger seat.

12. In a spacer according to claim 1 in which said body comprises
 a generally diamond-shaped body having a transverse opening therethrough and at least three concave seats adjacent to three of the respective apices of the diamond-shaped body, each seat being adapted to receive a conductor cable,
 three generally arcuate ratchet tooth means on said body located outwardly respectively from said concave conductor cable seats,
 three generally arcuate retaining means, and
 pivot means for maintaining pivotal connections between said retaining means and said body, said pivot means being located adjacent to the sides of said seats which are opposite to said body ratchet tooth means,
 the improvement comprising,
  three toggle means each of which comprises second ratchet tooth means on one surface thereof and third ratchet tooth means which is generally arcuate and extends from one end of said second ratchet tooth means, and
  three second pivot means adjacent respectively to the other ends of said retaining means for maintaining pivot connections between said other ends of the retaining means and said toggle means,
  whereby upon rotation of said toggle means about said second pivot means in one direction, the teeth of said third ratchet tooth means first engage some of the teeth of said first ratchet tooth means and then the teeth of the second ratchet tooth means engage other teeth of said first ratchet tooth means and thereby said second ratchet tooth means are adapted to hold conductor cables in said concave seats.

* * * * *

UNITED STATES PATENT AND TRADEMARK OFFICE
CERTIFICATE OF CORRECTION

PATENT NO. : 4,082,917
DATED : April 4, 1978
INVENTOR(S) : William Louis Hendrix It is certified that error appears in the above-identified patent and that said Letters Patent are hereby corrected as shown below:

Column 4, line 31, change "75B" to --70B--;

Column 8, line 10, after "whereby" insert --upon--;
        line 12, change "fifth" to --sixth--;
        line 14, change "second" to --fifth--.

Signed and Sealed this

Twenty-fifth Day of July 1978

[SEAL]

Attest:

RUTH C. MASON
Attesting Officer

DONALD W. BANNER
Commissioner of Patents and Trademarks